US012343745B2

(12) United States Patent
Kakuta et al.

(10) Patent No.: US 12,343,745 B2
(45) Date of Patent: Jul. 1, 2025

(54) TRIGGER-TYPE LIQUID EJECTOR

(71) Applicant: YOSHINO KOGYOSHO CO., LTD., Tokyo (JP)

(72) Inventors: Yoshiyuki Kakuta, Tokyo (JP); Kota Sakata, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 517 days.

(21) Appl. No.: 17/772,213

(22) PCT Filed: Oct. 29, 2020

(86) PCT No.: PCT/JP2020/040572
§ 371 (c)(1),
(2) Date: Apr. 27, 2022

(87) PCT Pub. No.: WO2021/085520
PCT Pub. Date: May 6, 2021

(65) Prior Publication Data
US 2022/0401982 A1 Dec. 22, 2022

(30) Foreign Application Priority Data
Oct. 31, 2019 (JP) ................................ 2019-199251

(51) Int. Cl.
*B05B 11/10* (2023.01)

(52) U.S. Cl.
CPC ........ *B05B 11/104* (2023.01); *B05B 11/1057* (2023.01); *B05B 11/1067* (2023.01)

(58) Field of Classification Search
CPC ............... B05B 11/104; B05B 11/1057; B05B 11/1067
(Continued)

(56) References Cited

U.S. PATENT DOCUMENTS 4,858,788 A * 8/1989 Meckenstock ........ B05B 9/0883 222/207
5,704,550 A * 1/1998 Foster .................. B05B 1/3452 239/480
(Continued)

FOREIGN PATENT DOCUMENTS

CN 1172442 A 2/1998
CN 109311039 A 2/2019
(Continued)

OTHER PUBLICATIONS

JP2019177897 English by Google (Year: 2019).*
(Continued)

*Primary Examiner* — Chee-Chong Lee
(74) *Attorney, Agent, or Firm* — Oliff PLC

(57) ABSTRACT

A trigger-type liquid ejector including an ejector main body and a nozzle member. The ejector main body includes: a longitudinal supply tube portion; a trigger mechanism including a trigger portion; a reservoir cylinder; a reservoir plunger; and a reservoir valve. The longitudinal supply tube portion includes an outer tube and an inner tube. A recovery passage is provided between the outer tube and the inner tube. The reservoir valve is provided in the inner tube and configured to allow supply of a liquid from the longitudinal supply tube portion into the reservoir cylinder by being elastically deformed in the vertical direction.

2 Claims, 5 Drawing Sheets

(58) Field of Classification Search
USPC .......................................................... 239/526
See application file for complete search history.

(56) References Cited

U.S. PATENT DOCUMENTS

| | | | | |
|---|---|---|---|---|
| 6,131,820 | A * | 10/2000 | Dodd | B05B 11/1011 239/492 |
| 6,641,003 | B1 * | 11/2003 | Foster | B05B 11/007 222/383.1 |
| 2014/0069962 | A1 * | 3/2014 | Dennis | B05B 11/0056 222/382 |
| 2016/0016188 | A1 * | 1/2016 | Spang | B05B 11/1023 53/410 |
| 2017/0216863 | A1 | 8/2017 | Kakuta et al. | |
| 2018/0141065 | A1 | 5/2018 | Son | |
| 2018/0369842 | A1 * | 12/2018 | Kakuta | B65D 83/202 |

FOREIGN PATENT DOCUMENTS

| | | | |
|---|---|---|---|
| JP | 2014-213296 | A | 11/2014 |
| JP | 2017-080724 | A | 5/2017 |
| JP | 2017-114543 | A | 6/2017 |
| JP | 2017-114551 | A | 6/2017 |
| JP | 2018-083187 | A | 5/2018 |
| JP | 2019-177897 | A | 10/2019 |
| WO | 2016/068191 | A1 | 5/2016 |

OTHER PUBLICATIONS

Apr. 24, 2023 Office Action issued in Chinese Patent Application No. 202080075398.9.
Dec. 15, 2020 International Search Report issued in International Patent Application No. PCT/JP2020/040572.
Nov. 7, 2023 Search Report issued in European Patent Application No. 20880887.3.

* cited by examiner

TRIGGER-TYPE LIQUID EJECTOR

TECHNICAL FIELD

The present invention relates to a trigger-type liquid ejector.

Priority is claimed on Japanese Patent Application No. 2019-199251, filed Oct. 31, 2019, the content of which is incorporated herein by reference.

BACKGROUND ART

A trigger-type liquid ejector including a reservoir cylinder into which a liquid that has passed through a longitudinal supply tube portion is supplied according to rearward movement of a trigger portion, a reservoir plunger disposed to be movable in the reservoir cylinder in an axial direction along a center axis thereof, configured to move toward one side in the axial direction according to supply of the liquid into the reservoir cylinder and biased toward the other side by a biasing member, and a reservoir valve configured to allow supply of the liquid into the reservoir cylinder from the longitudinal supply tube portion and configured to restrict outflow of the liquid into the longitudinal supply tube portion from the reservoir cylinder is known (for example, see Patent Document 1).

CITATION LIST

Patent Document

[Patent Document 1]
Japanese Unexamined Patent Application, First Publication No. 2017-114543

SUMMARY OF INVENTION

Technical Problem

In such a trigger-type liquid ejector, a reservoir valve is an annular shape provided in a reservoir cylinder, a part of the reservoir valve in a circumferential direction is pressed against a circumferential edge portion of a supply hole formed in the reservoir cylinder by an elastic force, and the supply hole is closed to be open. However, the elastic force of the reservoir valve may vary depending on the position in the circumferential direction, and it may be difficult to appropriately obtain sealability of the supply hole by the reservoir valve. In addition, in the above-mentioned trigger-type liquid ejector, an outer diameter of the reservoir valve is likely to be large because an inner diameter of the reservoir cylinder is relatively large. Accordingly, the elastic force of the reservoir valve tends to be relatively small, and the sealability of the supply hole by the reservoir valve may be insufficient.

In consideration of the above-mentioned circumstances, an aspect of the present invention is directed to providing a trigger-type liquid ejector having a structure capable of improving sealability by a reservoir valve.

Solution to Problem

A first aspect of a trigger-type liquid ejector of the present invention includes an ejector main body mounted in a container body in which a liquid is accommodated; and a nozzle member provided with an ejecting hole configured to inject the liquid forward. In the trigger-type liquid ejector, the ejector main body includes: a longitudinal supply tube portion extending in a vertical direction, and configured to suction up the liquid into the container body; a trigger mechanism including a trigger portion disposed to movable rearward while being biased forward in front of the longitudinal supply tube portion, and configured to cause the liquid to flow from the longitudinal supply tube portion toward the ejecting hole according to rearward movement of the trigger portion; a reservoir cylinder into which the liquid that has passed through the longitudinal supply tube portion is supplied according to rearward movement of the trigger portion; a reservoir plunger disposed to be movable in an axial direction along a center axis of the reservoir cylinder in the reservoir cylinder, configured to move toward one side in the axial direction according to supply of the liquid into the reservoir cylinder, and biased toward the other side in the axial direction by a biasing member; and a reservoir valve configured to allow supply of the liquid from the longitudinal supply tube portion into the reservoir cylinder, and configured to restrict outflow of the liquid from the reservoir cylinder into the longitudinal supply tube portion. The longitudinal supply tube portion includes: an outer tube; and an inner tube fitted into the outer tube and through which the liquid being to be supplied into the reservoir cylinder flows. A recovery passage configured to allow communication between the reservoir cylinder and the container body when the reservoir plunger is moved to the one side, is provided between the outer tube and the inner tube. The reservoir valve is provided in the inner tube and configured to allow supply of the liquid from the longitudinal supply tube portion into the reservoir cylinder by being elastically deformed in the vertical direction.

According to the first aspect of the trigger-type liquid ejector of the present invention, the reservoir valve is provided in the inner tube of the longitudinal supply tube portion, and allows supply of the liquid from the longitudinal supply tube portion into the reservoir cylinder by being elastically deformed in the vertical direction. For this reason, in comparison with the case in which the reservoir valve is disposed in the reservoir cylinder, it is easy to reduce the reservoir valve in size and secure an elastic force of the reservoir valve. Accordingly, it is easy to secure sealability by the reservoir valve. In addition, unlike the case in which the supply hole is closed by a part of the annular valve body in the circumferential direction, variation of the sealability can be reduced. In addition, since an elastically deformed portion of the reservoir valve is elastically deformed in the vertical direction as a whole, in comparison with the case in which only a part of the elastically deformed portion is elastically deformed, it is difficult to degrade the reservoir valve and it is easy to maintain the sealability appropriately.

As described above, according to the aspect of the trigger-type liquid ejector of the present invention, a trigger-type liquid ejector having a structure capable of improving sealability by a reservoir valve is obtained.

According to a second aspect of the trigger-type liquid ejector, in the trigger-type liquid ejector of the first aspect, an upper end portion of the inner tube is an upper end opening portion that opens upward, a valve seat portion on which the reservoir valve is seated from above is formed on an inner circumferential surface of the inner tube, the reservoir valve includes: a fixed portion fixed into the upper end opening portion; a valve main body portion seated on the valve seat portion from above; and an elastic deforming portion that connects the fixed portion and the valve main body portion, and configured to be elastically deformed in the vertical direction, and the fixed portion tightly closes the upper end opening portion.

According to the second aspect of the trigger-type liquid ejector of the present invention, the upper end opening portion of the inner tube can be closed while improving moldability using the inner tube formed to open upward. In particular, when the inner tube can be formed to open upward, it is easy to mold the valve seat portion through injection molding using a mold or the like. In addition, since the upper end opening portion of the inner tube can be closed using the reservoir valve, in comparison with the case in which the member configured to close the upper end opening portion of the inner tube is separately provided, the number of parts of the trigger-type liquid ejector can be reduced. In addition, since the upper end opening portion of the inner tube can be closed by attaching the reservoir valve into the inner tube, there is no need to separately perform work of closing the upper end opening portion of the inner tube other than the attachment work of the reservoir valve. Accordingly, the trigger-type liquid ejector can be easily assembled.

Effects of Invention

According to an aspect of the present invention, it is possible to provide a trigger-type liquid ejector having a structure capable of improving sealability by a reservoir valve.

DESCRIPTION OF EMBODIMENTS

Hereinafter, a trigger-type liquid ejector according to an embodiment of the present invention will be described with reference to the accompanying drawings. Further, the scope of the present invention is not limited to the following embodiment and may be arbitrarily modified without departing from the technical spirit of the present invention. In addition, in the following drawings, in order to make each component easier to understand, a scale, the number, or the like, of each component may be different from those in an actual component.

Figure 1:
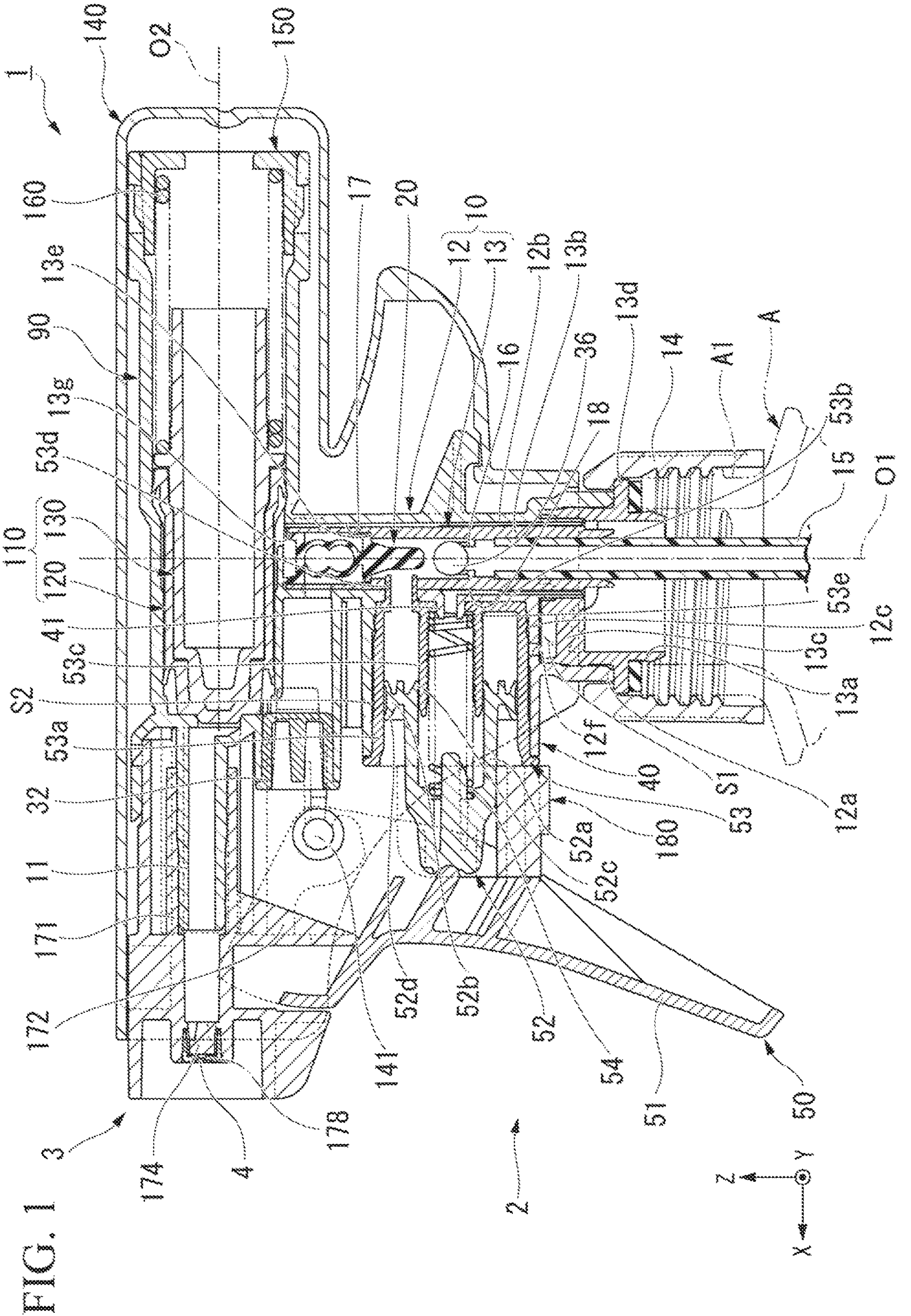
FIG. 1 is a cross-sectional view showing a trigger-type liquid ejector according to an embodiment.

As shown in FIG. 1, a trigger-type liquid ejector 1 of the embodiment includes: an ejector main body 2 including a longitudinal supply tube portion 10 and mounted on a container body A that accommodates a liquid and configured to suction up the liquid, and a nozzle member 3 provided with an ejecting hole 4 that injects the liquid, and mounted on the ejector main body 2.

Further, each component of the trigger-type liquid ejector 1 is, for example, a molded product using a synthetic resin unless the context clearly indicates otherwise.

The ejector main body 2 includes the longitudinal supply tube portion 10, a mounting cap 14, an injection tube portion 11, a trigger mechanism 50, a reservoir cylinder 90, a support member 150, a reservoir plunger 110, a biasing member 160, a reservoir valve 20, and a cover body 140. The reservoir cylinder 90 is formed in a cylindrical shape with a top, and the reservoir plunger 110 and the biasing member 160 are disposed inside the reservoir cylinder 90. The cover body 140 covers all of the longitudinal supply tube portion 10, the injection tube portion 11, and the reservoir cylinder 90 from at least both sides in a leftward/rightward direction and above.

In the embodiment, a center axis of the longitudinal supply tube portion 10 is referred to as an axis O1, and a direction along the axis O1 (i.e., a Z-axis direction) is referred to as a vertical direction. In the vertical direction, a side of the container body A (i.e., a −Z side) is referred to as a lower side or below, and an opposite side (i.e., a +Z side) is referred to as an upper side or above. In a plan view seen in the vertical direction, a direction crossing the axis O1 (i.e., an X-axis direction) is referred to as a forward/rearward direction, and a direction crossing both of the vertical direction and the forward/rearward direction (i.e., a Y-axis direction) is referred to as a leftward/rightward direction. In the forward/rearward direction, an open side of the ejecting hole 4 formed in the nozzle member 3 (i.e., a +X side) is referred to as a front side or before, and an opposite side (i.e., a −X side) is referred to as a rear side or behind.

In addition, in the embodiment, a center axis of the reservoir cylinder 90 is referred to as an axis O2. In the embodiment, the axis O2 extends in the forward/rearward direction. That is, in the embodiment, the forward/rearward direction corresponds to an axial direction along the center axis of the reservoir cylinder 90. In addition, in the embodiment, the rear side (i.e., the −X side) corresponds to one side in the axial direction along the center axis of the reservoir cylinder 90. In addition, in the embodiment, the front side (i.e., the +X side) corresponds to the other side in the axial direction along the center axis of the reservoir cylinder 90. However, further, the axial direction along the axis O2 may not coincide with the forward/rearward direction.

The longitudinal supply tube portion 10 is a portion extending in the vertical direction and suctioning up the liquid in the container body A. The longitudinal supply tube portion 10 includes an outer tube 12 having a cylindrical shape with a top, and an inner tube 13 fitted into the outer tube 12. In the embodiment, the outer tube 12 and the inner tube 13 are formed in a two-stage tubular shape having a diameter that is reduced from below toward above. The axis O1 of the longitudinal supply tube portion 10 constituted by the outer tube 12 and the inner tube 13 is eccentric rearward with respect to a container axis of the container body A.

Figure 2:
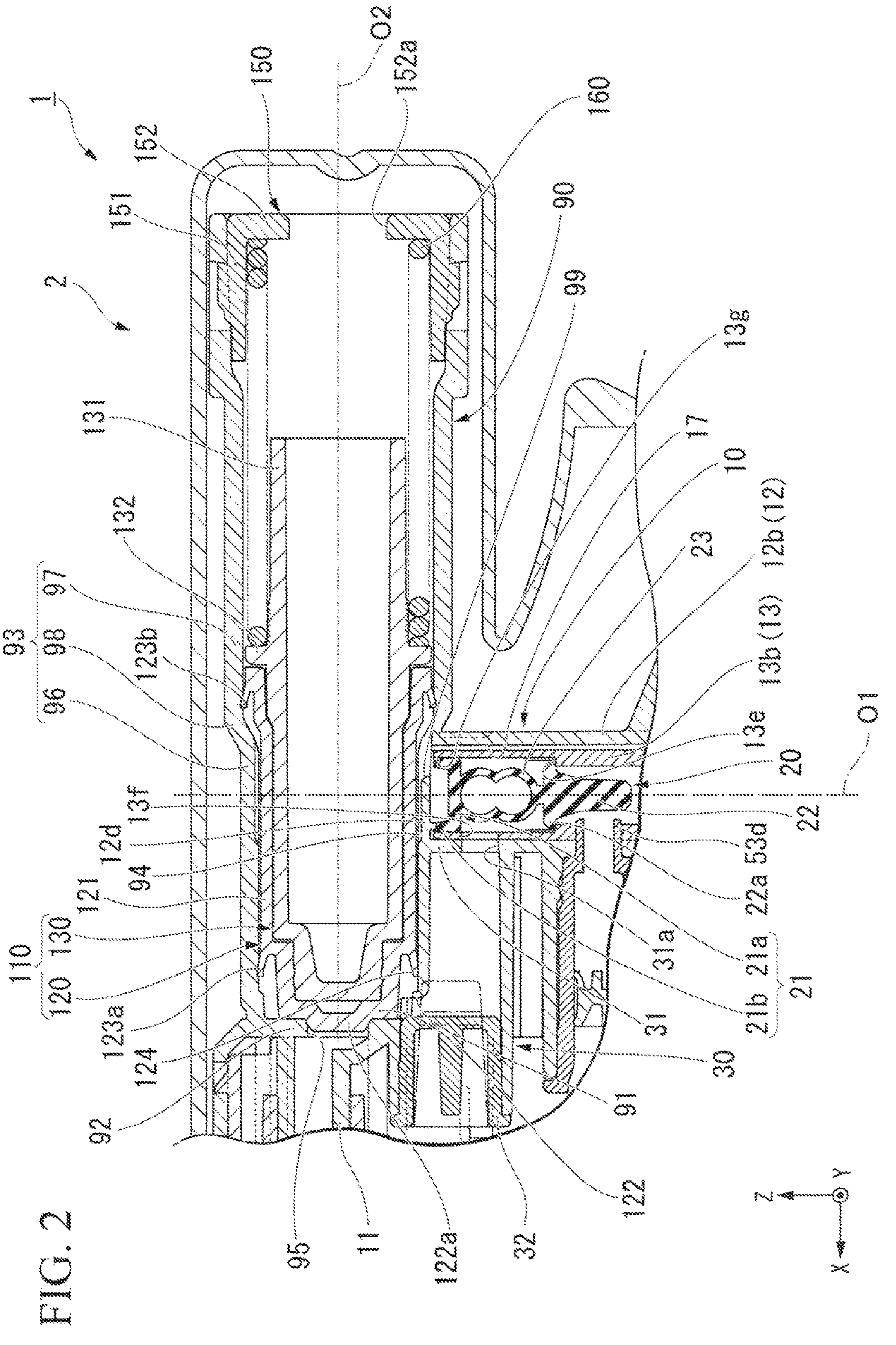
FIG. 2 is a cross-sectional view showing a part of the trigger-type liquid ejector according to the embodiment.

The outer tube 12 includes a large diameter portion **12*a*, a small diameter portion 12*b* disposed above the large diameter portion 12*a* and having a diameter smaller than that of the large diameter portion 12*a*, and an annular connecting portion 12*c* that connects an upper end portion of the large diameter portion 12*a* and a lower end portion of the small diameter portion 12*b*. The small diameter portion 12*b* is a capped cylindrical shape disposed coaxially with the axis O1. As shown in FIG. 2, an apex wall portion 12*d* of the small diameter portion 12*b* is formed integrally with the reservoir cylinder 90**.

A liquid being to be supplied into the reservoir cylinder 90 passes through the inner tube 13. As shown in FIG. 1, the inner tube 13 includes a large diameter portion 13*a*, a small diameter portion 13*b* disposed above the large diameter portion 13*a* and having a diameter smaller than that of the large diameter portion 13*a*, and an annular connecting portion 13*c* that connects an upper end portion of the large diameter portion 13*a* and a lower side portion of the small diameter portion 13*b*, and is formed in a two-stage tubular shape having a diameter reduced from below toward above.

The large diameter portion 13*a* is located on an inner side of the large diameter portion 12*a* of the outer tube 12. A lower end portion of the large diameter portion 13*a* protrudes below a lower end portion of the large diameter portion 12*a* of the outer tube 12. An annular brim portion 13*d* protruding outward in the radial direction of the large diameter portion 13*a* is formed on a portion of the large diameter portion 13*a* protruding downward from the large diameter portion 12*a* of the outer tube 12. A brim portion 13*d* is disposed in an upper end portion of the mounting cap 14 mounted (for example, screwed) onto a mouth portion A1 of the container body A, and an upper end portion of the mounting cap 14 is rotatably locked around an axis thereof. The brim portion 13*d* is sandwiched between the mounting cap 14 and an upper end opening edge in the mouth portion A1 of the container body A in the vertical direction.

The small diameter portion 13*b* is a cylindrical shape disposed coaxially with the axis O1, and opens on both sides in the vertical direction. The upper end portion of the small diameter portion 13*b* is an upper end portion of the inner tube 13, and an upper opening portion 13*g* that opens upward. The small diameter portion 13*b* is located inside the small diameter portion 12*b* in the outer tube 12. The upper end portion of the small diameter portion 13*b* faces below the apex wall portion 12*d* of the outer tube 12 with a slight gap. An upper portion of a pipe 15 extending in the vertical direction is fitted into the lower side portion of the small diameter portion 13*b*. The pipe 15 is disposed in the container body A. A lower end opening of the pipe 15 is located at a bottom portion (that is not shown) of the container body A. A liquid of the container body A flows into the small diameter portion 13*b* from the pipe 15.

The annular connecting portion 13*c* is located below the annular connecting portion 12*c* in a state in which a gap S1 is secured between the annular connecting portion 12*c* of the outer tube 12 and the annular connecting portion 13*c*.

As shown in FIG. 2, a valve seat portion 13*e* is formed on an inner circumferential surface of the inner tube 13. In the embodiment, the valve seat portion 13*e* is formed by a step difference such that an inner diameter of a portion of the inner tube 13 above the valve seat portion 13*e* is greater than an inner diameter of a portion below the valve seat portion 13*e*. The reservoir valve 20 is located on the valve seat portion 3*e* from above.

As shown in FIG. 1, a support tube portion 16 formed in a cylindrical shape having an inner diameter smaller than that of the inner tube 13 is disposed on a portion of an inner circumferential surface of the inner tube 13 located below the valve seat portion 13*e* and above the upper end of the pipe 15. The support tube portion 16 is disposed coaxially with the axis O1, and the lower end portion protrudes outward in the radial direction and is formed integrally with the inner circumferential surface of the inner tube 13. The support tube portion 16 supports a ball valve 36 (to be described below) from below. An upper end surface of the support tube portion 16 is a seating surface on which the ball valve 36 is placed, and is formed in a tapered shape when seen in a longitudinal cross-sectional view.

The ball valve 36 is disposed in the inner tube 13 to be movable in the vertical direction. In the embodiment, the ball valve 36 is disposed in a portion of the small diameter portion 13*b* in the inner tube 13 located above the support tube portion 16. The ball valve 36 is placed detachably on the seating surface of the support tube portion 16. The ball valve 36 communicates and blocks a space in the inner tube 13 located above the support tube portion 16 and a space located below the support tube portion 16.

A recovery passage 17 is provided between the outer tube 12 and the inner tube 13. The recovery passage 17 extends in the vertical direction and opens on both sides in the vertical direction. In the embodiment, the recovery passage 17 is located behind the axis O1. The recovery passage 17 is formed in, for example, an outer circumferential surface of the small diameter portion 13*b* of the inner tube 13 in a longitudinal groove shape. The recovery passage 17 passes through the small diameter portion 13*b* in the vertical direction and includes a lower end portion that opens in the large diameter portion 13*a*. Accordingly, the recovery passage 17 communicates with the container body A.

As shown in FIG. 2, a connecting tube portion 30 extending forward is provided on an upper end portion of the longitudinal supply tube portion 10. A rear end portion of the connecting tube portion 30 is connected to the outer tube 12. The connecting tube portion 30 is a cylindrical shape with a bottom that opens forward. A bottom portion 31 of the connecting tube portion 30 is formed integrally with an upper end portion of the outer tube 12. A through-hole 31*a* passing through the bottom portion 31 in the forward/rearward direction is formed in a lower side portion of the bottom portion 31. The through-hole 31*a* communicates with a through-hole 3*f* formed in an upper end portion of the inner tube 13. The through-hole 13*f* is formed in a portion of the small diameter portion 13*b* of the inner tube 13 located above the valve seat portion 13*e*. Accordingly, the connecting tube portion 30 communicates with a portion of the inner tube 13 located above the valve seat portion 13*e* via the through-holes 31*a* and 13*f*.

An inner diameter of the connecting tube portion 30 is equal to or greater than an inner diameter of the inner tube 13. In the embodiment, an inner diameter of the connecting tube portion 30 is greater than an inner diameter of the inner tube 13. A restricting plug 32 press-fitted into the connecting tube portion 30 is provided on a front end portion of the connecting tube portion 30. The front end opening of the connecting tube portion 30 is closed by the restricting plug 32.

As shown in FIG. 1, a tube portion 40 for a cylinder is provided below the connecting tube portion 30 at an interval. The tube portion 40 for a cylinder protrudes forward from the small diameter portion 12*b* of the outer tube 12 and opens forward. A rear side portion of a lower end portion of the tube portion 40 for a cylinder is formed integrally with the annular connecting portion 12*c*.

A fitting tube portion 41 protruding forward from the small diameter portion 12*b* of the outer tube 12 is provided inside the tube portion 40 for a cylinder. The fitting tube portion 41 is disposed coaxially with the tube portion 40 for a cylinder. A front end portion of the fitting tube portion 41 is located behind the front end portion of the tube portion 40 for a cylinder. The fitting tube portion 41 opens on both sides in the forward/rearward direction.

A connecting passage 18 extending in the vertical direction is formed in a forward portion of the longitudinal supply tube portion 10 between the inner circumferential surface of the outer tube 12 and the outer circumferential surface of the inner tube 13. The connecting passage 18 brings the fitting tube portion 41 and the large diameter portion 13*a* of the inner tube 13 in communication with each other. Accordingly, the connecting passage 18 brings the fitting tube portion 41 and the container body A in communication with each other via the large diameter portion 13*a*.

The injection tube portion 11 extends in the forward/rearward direction, and the inside of the injection tube portion 11 communicates with the inside of the longitudinal supply tube portion 10. The injection tube portion 11 extends forward from the reservoir cylinder 90, and a liquid in the longitudinal supply tube portion 10 is introduced to the ejecting hole 4. Further, the injection tube portion 11 is disposed such that, for example, a center axis is located above the axis O2 of the reservoir cylinder 90.

The trigger mechanism 50 includes a trigger portion 51, a cylinder 53, a piston 52, and a coil spring 54.

The trigger portion 51 extends downward from a portion of the cover body 140 located below the injection tube portion 11. The trigger portion 51 is disposed swingably (i.e., movably) behind in a forward biasing state in front of the longitudinal supply tube portion 10. The trigger portion 51 is swingable in the forward/rearward direction about a rotary shaft portion 141 provided on the cover body 140. According to the swinging of the trigger portion 51 in the forward/rearward direction, the piston 52 is movable in the forward/rearward direction. The trigger mechanism 50 causes the liquid to flow from the longitudinal supply tube portion 10 toward the ejecting hole 4 through the injection tube portion 11 according to the rearward swinging (i.e., moving) of the trigger portion 51. The upper end portion of the trigger portion 51 comes into contact with a lower end portion of a restricting wall 172 (to be described below) from a diagonal forward and downward side according to biasing by the coil spring 54. Accordingly, the trigger portion 51 is located at the foremost swinging position.

The cylinder 53 includes an outer tube portion 53*a* that opens forward, a rear wall portion 53*b* configured to close a rearward opening portion of the outer tube portion 53*a*, a tubular piston guide 53*c* protruding forward from a central portion of the rear wall portion 53*b*, and a tubular communication tube portion 53*d* protruding rearward from a portion of the rear wall portion 53*b* above a piston guide 53*c* and opening rearward. The outer tube portion 53*a* is fitted into the tube portion 40 for a cylinder. An inner circumferential surface of the tube portion 40 for a cylinder and an outer circumferential surface of the outer tube portion 53*a* are in close contact with each other on both end portions in the forward/rearward direction. Meanwhile, an annular gap S2 is secured between the inner circumferential surface of the tube portion 40 for a cylinder and the outer circumferential surface of the outer tube portion 53*a* in an intermediate portion located between both end portions in the forward/rearward direction.

While not shown, a first vent hole configured to bring the inside of the outer tube portion 53*a* and the gap S2 in communication with each other is formed in the outer tube portion 53*a*. A second vent hole 12*f* configured to bring the gap S2 and the gap S1 defined between the annular connecting portion 12*c* of the outer tube 12 and the annular connecting portion 13*c* of the inner tube 13 in communication with each other is formed in the annular connecting portion 12*c* of the outer tube 12. Further, while not shown, a third vent hole configured to bring the gap S1 and the inside of the mounting cap 14 in communication with each other is formed in the annular connecting portion 13*c* of the inner tube 13. The third vent hole is formed in, for example, a portion of the annular connecting portion 13*c* located in front of the small diameter portion 13*b* of the inner tube 13. The third vent hole is provided adjacent to, for example, the connecting passage 18.

A rear end portion of a communication tube portion 53*d* passes through a through-hole formed in the outer tube 12 and a through-hole formed in the inner tube 13 to protrude in the inner tube 13. More specifically, a rear end portion of the communication tube portion 53*d* protrudes in a portion of the small diameter portion 13*b* of the inner tube 13 located between the valve seat portion 13*e* and the support tube portion 16 in the vertical direction. The communication tube portion 53*d* is press-fitted into the through-hole formed in the outer tube 12 and the through-hole formed in the inner tube 13. The inside of the inner tube 13 and the inside of the cylinder 53 of the longitudinal supply tube portion 10 are in communication with each other through the communication tube portion 53*d*. More specifically, the inside of the cylinder 53 communicates with a space in the inner tube 13 located between the valve seat portion 13*e* and the support tube portion 16 through the communication tube portion 53*d*. Accordingly, the ball valve 36, which sits in the valve seat portion 13*e* in a detachable manner, can switch between communication and blocking thereof between the container body A and the cylinder 53.

The ball valve 36 is a check valve that is closed upon compression in the cylinder 53, blocks communication between the container body A and the longitudinal supply tube portion 10, opened according to upward displacement upon decompression in the cylinder 53, and configured to allow communication between the container body A and the longitudinal supply tube portion 10. Accordingly, when the ball valve 36 is closed, communication between the container body A and the cylinder 53 through the longitudinal supply tube portion 10 is blocked, and when the ball valve 36 is open, communication between the container body A and the cylinder 53 through the longitudinal supply tube portion 10 is allowed. Since the reservoir valve 20 is disposed above the ball valve 36, further upward displacement of the ball valve 36 can be restricted by the reservoir valve 20. Further, upward displacement of the ball valve 36 may be restricted by the rear end portion of the communication tube portion 53*d*.

The piston guide 53*c* includes a cylindrical shape with a bottom that opens forward. The piston guide 53*c* is disposed inside the outer tube portion 53*a*. A front end portion of the piston guide 53*c* is located behind a front end portion of the outer tube portion 53*a*. A through-hole into which the fitting tube portion 41 is fitted from behind is formed in a bottom portion of the piston guide 53*c*. A front end portion of the fitting tube portion 41 protrudes in the piston guide 53*c*. The piston guide 53*c* and the fitting tube portion 41 are disposed coaxially with each other. An annular recessed portion 53*e* is formed in an outer circumferential surface of the rear end portion of the piston guide 53*c*.

The piston 52 is disposed movably in the cylinder 53 in the forward/rearward direction. The piston 52 moves in the forward/rearward direction in conjunction with the swinging of the trigger portion 51. According to movement of the piston 52 in the forward/rearward direction, the inside of the cylinder 53 is compressed and decompressed. The piston 52 includes a cylindrical shape with a top and disposed coaxially with the cylinder 53 and opening rearward. The piston 52 is biased forward by a biasing force of the coil spring 54 together with the trigger portion 51. The piston 52 moves rearward according to rearward swinging of the trigger portion 51 and is pushed into the cylinder 53. The piston 52 includes a piston main body portion 52*a* that opens rearward and into which the piston guide 53*c* is inserted, and a sliding tube portion 52*b* protruding outward from the rear end portion of the piston main body portion 52*a* in the radial direction and in sliding contact with the inner circumferential surface of the outer tube portion 53*a*.

The piston main body portion 52*a* is formed to have an inner diameter that is slightly greater than an outer diameter of the piston guide 53*c*. The inner circumferential surface of the piston main body portion 52*a* and the outer circumferential surface of the piston guide 53*c* face each other with a slight gap in the radial direction of the piston 52. The front end portion of the piston main body portion 52*a* comes into contact with the trigger portion 51 from behind.

An annular inner lip portion 52*c* protruding inward in the radial direction of the piston main body portion 52*a* and in sliding contact with the outer circumferential surface of the piston guide 53*c* is formed on the rear end portion of the piston main body portion 52*a*. Accordingly, sealability is secured between the inner lip portion 52*c* and the outer circumferential surface of the piston guide 53*c*.

Here, when the piston 52 moves rearward and the inner lip portion 52*c* reaches a position facing the recessed portion 53*e* in the radial direction, a slight gap is formed between the inner lip portion 52*c* and the recessed portion 53*e*. Accordingly, the outer tube portion 53*a* of the cylinder 53 communicates with a gap between the inner circumferential surface of the piston main body portion 52*a* and the outer circumferential surface of the piston guide 53*c* through the gap between the inner lip portion 52*c* and the recessed portion 53*e*. Accordingly, the outer tube portion 53*a* of the cylinder 53 comes into communication with the fitting tube portion 41 through the piston guide 53*c*. Further, in the embodiment, the inner lip portion 52*c* reaches a position facing the recessed portion 53*e* in the radial direction when the piston 52 has moved to the rearmost position.

The sliding tube portion 52*b* is formed in a tapered shape having a diameter that is gradually increased from a central portion toward forward and rearward sides in the forward/rearward direction. The sliding tube portion 52*b* includes outer lip portions 52*d* located at both end portions in the forward/rearward direction. The outer lip portion 52*d* comes into sliding contact with the inner circumferential surface of the outer tube portion 53*a*. Accordingly, sealability is secured between the outer lip portion 52*d* and the inner circumferential surface of the outer tube portion 53*a*.

When the trigger portion 51 is located at the foremost swinging position (i.e., the foremost moving position), the piston 52 is located at the foremost position to correspond thereto, and the sliding tube portion 52*b* closes the first vent hole formed in the outer tube portion 53*a*. Then, when the piston 52 moves rearward from the foremost position by a predetermined amount by rearward swinging of the trigger portion 51, the sliding tube portion 52*b* opens the first vent hole to the outside of the trigger-type liquid ejector 1. Accordingly, the inside of the container body A communicates with the outside of the trigger-type liquid ejector 1 through the third vent hole formed in the annular connecting portion 13*c* of the inner tube 13 and the second vent hole 12*f* and the first vent hole formed in the annular connecting portion 12*c* of the outer tube 12.

The coil spring 54 extends in the forward/rearward direction. The coil spring 54 is formed of, for example, a metal. The coil spring 54 is disposed to straddle the inside of the piston guide 53*c* and the inside of the piston main body portion 52*a*. A rear end portion of the coil spring 54 comes into contact with a bottom portion of the piston guide 53*c* (i.e., the rear wall portion 53*b*). The rear end portion of the coil spring 54 surrounds the front end portion of the fitting tube portion 41. A front end portion of the coil spring 54 comes into contact with a step difference portion formed on the inner circumferential surface of the piston main body portion 52*a* from behind. Accordingly, the coil spring 54 applies a forward biasing force against the piston 52. Since the forward biasing force is applied by the coil spring 54, the piston 52 biases the trigger portion 51 in a forward direction.

A stopper 180 is detachably attached to the trigger mechanism 50 between the trigger portion 51 and the cylinder 53 in the forward/rearward direction. The stopper 180 comes into contact with the trigger portion 51 from behind and the cylinder 53 from the front. In a state in which the stopper 180 is attached, rearward swinging (i.e., moving) of the trigger portion 51 is restricted. The stopper 180 is attached, for example, when the trigger-type liquid ejector 1 is distributed or stored. A user uses the trigger-type liquid ejector 1 in a state in which the stopper 180 is removed. The user may discard the removed stopper 180, or may attach the stopper 180 again after use of the trigger-type liquid ejector 1 is terminated and restrict rearward swinging of the trigger portion 51.

As shown in FIG. 2, the reservoir cylinder 90 is disposed above the connecting tube portion 30. A liquid that has passed through the longitudinal supply tube portion 10 and the connecting tube portion 30 is supplied into the reservoir cylinder 90 by rearward swinging (i.e., moving) of the trigger portion 51. The reservoir cylinder 90 extends in the forward/rearward direction and straddles the longitudinal supply tube portion 10 in the forward/rearward direction. The reservoir cylinder 90 is disposed parallel to, for example, the connecting tube portion 30 and the tube portion 40 for a cylinder.

The reservoir cylinder 90 is formed to protrude rearward from the longitudinal supply tube portion 10. A lower end portion of the reservoir cylinder 90 is formed integrally with an upper end portion of the longitudinal supply tube portion 10 and an upper end portion of the connecting tube portion 30. The reservoir cylinder 90 includes a front wall portion 92 disposed above the front side portion of the connecting tube portion 30 and a cylinder tube 93 extending rearward from the front wall portion 92, and is formed in a tubular shape that opens rearward as a whole. A communication hole 95 passing through the front wall portion 92 in the forward/rearward direction is formed in the front wall portion 92. The communication hole 95 is, for example, a circular hole disposed coaxially with the axis O2. The communication hole 95 brings the inside of the reservoir cylinder 90 and the inside of the injection tube portion 11 in communication with each other.

The cylinder tube 93 includes a front tube portion 96 connected to the front wall portion 92, a rear tube portion 97 having an outer diameter and an inner diameter greater than those of the front tube portion 96 and located behind the front tube portion 96, and a step portion 98 that connects the front tube portion 96 and the rear tube portion 97 in the forward/rearward direction, and is formed in an multi-stage tubular shape having a diameter that is gradually increased from the front side toward the rear side. The step portion 98 includes a diameter that is gradually increased from the front side toward the rear side. The rear tube portion 97 is disposed behind the longitudinal supply tube portion 10.

A supply hole 91, a communicating groove 94, and a recovery hole 99 are formed in the reservoir cylinder 90. The supply hole 91 communicates with the connecting tube portion 30. In the embodiment, the supply hole 91 is formed in a lower side portion of a front end portion of the front tube portion 96. A liquid that has passed through the longitudinal supply tube portion 10 and the connecting tube portion 30 is supplied into the reservoir cylinder 90 through the supply hole 91.

The communicating groove 94 is formed in an inner circumferential surface of the rear end portion of the front tube portion 96. The communicating groove 94 extends in the forward/rearward direction and opens rearward. The plurality of communicating grooves 94 are disposed around the axis O2 at intervals.

The recovery hole 99 is formed in the step portion 98. The recovery hole 99 passes through a lower wall portion of the reservoir cylinder 90 in the vertical direction. A front side portion of the recovery hole 99 is formed on the apex wall portion 12*d* of the outer tube 12. The recovery hole 99 communicates with the recovery passage 17 provided in the ejector main body 2. The recovery hole 99 and the container body A are in communication with each other by the recovery passage 17. A rear end portion of the communicating groove 94 located on a lower side among the plurality of communicating grooves 94 is connected to the recovery hole 99.

The support member 150 is inserted into the reservoir cylinder 90 from a rear end opening portion of the reservoir cylinder 90. The support member 150 is disposed coaxially with the axis O2 and formed in a substantially cylindrical shape with a bottom that opens forward. The support member 150 includes a fitting tube portion 151 extending in the forward/rearward direction, and a support portion 152 configured to cover a rear opening portion of the fitting tube portion 151. The fitting tube portion 151 is fitted into the rear end opening portion of the reservoir cylinder 90. An air hole 152*a* passing through the support portion 152 in the forward/rearward direction is formed in a central portion of the support portion 152. The air hole 152*a* brings the inside and the outside of the reservoir cylinder 90 in communication with each other.

The reservoir plunger 110 is disposed in the reservoir cylinder 90 to be movable in the axial direction (i.e., the forward/rearward direction) of the center axis (i.e., the axis O2) of the reservoir cylinder 90. The reservoir plunger 110 is moved rearward according to supply of the liquid into the reservoir cylinder 90.

The reservoir plunger 110 includes a sliding member 120 that slides in the reservoir cylinder 90 in the forward/rearward direction, and a receiving member 130 fitted into the sliding member 120. The sliding member 120 and the receiving member 130 extend in the forward/rearward direction and are disposed coaxially with the axis O2.

The sliding member 120 includes, for example, a plunger tube 121 formed of a softer material than the receiving member 130 and extending in the forward/rearward direction, and a closing wall 122 configured to close the front end opening of the plunger tube 121.

A front end portion of the plunger tube 121 includes a diameter that is decreased. A gap is provided between the outer circumferential surface of the front end portion of the plunger tube 121 and the inner circumferential surface of the reservoir cylinder 90. The gap between the outer circumferential surface of the front end portion of the plunger tube 121 and the inner circumferential surface of the reservoir cylinder 90 communicates with the supply hole 91 formed in the reservoir cylinder 90.

A front lip portion 123*a* and a rear lip portion 123*b* are formed in the outer circumferential surface of the plunger tube 121 throughout the plunger tube 121 in the circumferential direction. The front lip portion 123*a* tightly slides on the inner circumferential surface of the front tube portion 96 in the cylinder tube 93 in the forward/rearward direction. Accordingly, sealability is secured between the front lip portion 123*a* and the inner circumferential surface of the front tube portion 96.

The front lip portion 123*a* is formed in a cylindrical shape that opens forward, and disposed on a front end portion of the plunger tube 121 with a gap in the radial direction. Accordingly, an annular concave groove 124 recessed rearward and surrounding the axis O2 is formed between the front end portion of the plunger tube 121 and the front lip portion 123*a*. The concave groove 124 communicates with the supply hole 91 of the reservoir cylinder 90. The rear lip portion 123*b* tightly slides on the inner circumferential surface of the rear tube portion 97 in the cylinder tube 93 in the forward/rearward direction. Accordingly, sealability is secured between the rear lip portion 123*b* and the inner circumferential surface of the rear tube portion 97.

A protrusion 122*a* protruding forward is formed in a central portion of a front end surface of the closing wall 122. The protrusion 122*a* is formed in a truncated cone shape disposed coaxially with the axis O2, and has an outer diameter that is reduced from the rear side toward the front side. Since an outer circumferential surface of the protrusion 122*a* comes into contact with the rear edge portion of the communication hole 95, the communication hole 95 is closed. Accordingly, the closing wall 122 closes the communication hole 95 to be able to open.

Further, a position of the reservoir plunger 110 when the closing wall 122 closes the communication hole 95 is a maximum advance position. When the reservoir plunger 110 is disposed at the maximum advance position, almost no liquid is contained in the reservoir cylinder 90.

The receiving member 130 includes a receiving tube 131 and a receiving seat portion 132. The receiving tube 131 is formed in a cylindrical shape with a top, a front end of which is closed, and disposed inside the plunger tube 121. Since an outer diameter of the receiving tube 131 is smaller than an inner diameter of the rear tube portion 97 of the cylinder tube 93, an annular gap is formed between the rear side portion of the receiving tube 131 and the rear tube portion 97. The biasing member 160 is attached to a rear side portion of the receiving member 130 using an annular gap.

The receiving seat portion 132 protrudes outward from the receiving tube 131 and is formed in an annular shape when seen in the forward/rearward direction. The receiving seat portion 132 is provided in an intermediate portion of the reservoir plunger 110 in the forward/rearward direction. The receiving seat portion 132 is in contact with or in close proximity to the plunger tube 121 from behind. A front end portion of the biasing member 160 comes into contact with the receiving seat portion 132 from behind.

The biasing member 160 is disposed between the receiving seat portion 132 of the reservoir plunger 110 and the support portion 152 of the support member 150 while being compressed in the forward/rearward direction. Accordingly, the reservoir plunger 110 is biased forward by the biasing member 160. In the embodiment, the biasing member 160 is a coil spring extending in the forward/rearward direction, disposed coaxially with the axis O2 and formed of a metal. Further, the biasing member 160 may use a coil spring formed of a resin, or may use another member having elasticity.

The biasing member 160 is disposed to surround the rear end portion of the receiving tube 131, and has a front end portion that comes into contact with the receiving seat portion 132 from behind, and a rear end portion that comes into contact with the support portion 152 from the front. Accordingly, the biasing member 160 biases the reservoir plunger 110 forward in the reservoir cylinder 90. Since the biasing member 160 biases the reservoir plunger 110 forward, the closing wall 122 is strongly pressed against the rear edge portion of the communication hole 95 from behind. Accordingly, the closing wall 122 preferably seals the communication hole 95.

The reservoir plunger 110 opens the communication hole 95 by opening the valve when the entire reservoir plunger 110 moves rearward against the biasing member 160. Accordingly, the reservoir plunger 110 can pressurize the liquid in the reservoir cylinder 90 until being moved rearward, and functions as an accumulator valve that is open when the pressure of the liquid reaches a predetermined value, i.e., when the reservoir plunger 110 moves rearward against the biasing member 160, and supplies the liquid pressurized toward the ejecting hole 4.

The reservoir valve 20 is a valve configured to allow supply of the liquid from the longitudinal supply tube portion 10 into the reservoir cylinder 90 and restrict outflow of the liquid from the reservoir cylinder 90 into the longitudinal supply tube portion 10. The reservoir valve 20 is provided in the inner tube 13 of the longitudinal supply tube portion 10. In the embodiment, the reservoir valve 20 includes a fixed portion 21 fixed into the upper end opening portion 13*g* of the inner tube 13, a valve main body portion 22 sitting on the valve seat portion 13*e* from above, and an elastic deforming portion 23 that connects the fixed portion 21 and the valve main body portion 22.

The fixed portion 21 includes a disk portion 21*a* disposed coaxially with the axis O1, and a tubular portion 21*b* protruding upward from an outer circumferential edge portion of the disk portion 21*a*. An outer circumferential surface of the tubular portion 21*b* is tightly fitted into an inner circumferential surface of the upper end opening portion 13*g*. Accordingly, the fixed portion 21 tightly closes the upper end opening portion 13*g* of the inner tube 13.

The valve main body portion 22 has a columnar shape disposed coaxially with the axis O1 and extending in the vertical direction. A lower end portion of the valve main body portion 22 is disposed to face above the ball valve 36. An upper end portion of the valve main body portion 22 is a flange portion 22*a* that expands outward in the radial direction. The flange portion 22*a* is disposed above the valve seat portion 13*e*. The flange portion 22*a* is seated in the valve seat portion 13*e* in a detachable manner. Since the flange portion 22*a* is seated in the valve seat portion 13*e*, a part of the inside of the inner tube 13 is closed. Accordingly, the reservoir valve 20 can restrict outflow of the liquid from the reservoir cylinder 90 into the longitudinal supply tube portion 10 through the connecting tube portion 30.

The elastic deforming portion 23 is a portion that is elastically deformable in the vertical direction. The elastic deforming portion 23 is, for example, an annular shape having a substantially eight-shaped outer shape when seen in a side view in the leftward/rightward direction. The elastic deforming portion 23 is compressively elastically deformed in the vertical direction as the valve main body portion 22 is lifted upward by the liquid when the liquid flows into the reservoir cylinder 90 from the longitudinal supply tube portion 10. Accordingly, the flange portion 22*a* is separated upward from the valve seat portion 13*e*, and supply of the liquid from the longitudinal supply tube portion 10 into the reservoir cylinder 90 is allowed. In this way, the reservoir valve 20 allows supply of the liquid from the longitudinal supply tube portion 10 into the reservoir cylinder 90 as being elastically deformed in the vertical direction.

As shown in FIG. 1, the nozzle member 3 includes a mounting tube 171 extending in the forward/rearward direction, the restricting wall 172 protruding downward from the mounting tube 171, and a nozzle shaft portion 174 located inside the front end portion of the mounting tube 171.

A rear side portion of the mounting tube 171 is tightly fitted onto the injection tube portion 11.

The trigger portion 51 comes in contact with a lower end portion of the restricting wall 172 from a diagonal forward downward side. Accordingly, the trigger portion 51 is located at the foremost swinging position.

The nozzle shaft portion 174 is located such that a center axis thereof is located slightly above the axis O2 of the reservoir cylinder 90. The nozzle shaft portion 174 is disposed coaxially with the injection tube portion 11. A front end portion of the nozzle shaft portion 174 is located slightly behind the front end portion of the mounting tube 171. A nozzle cap 178 in which the ejecting hole 4 opening forward and configured to inject the liquid forward is mounted on the nozzle shaft portion 174. In the embodiment, the ejecting hole 4 is disposed coaxially with the injection tube portion 11. A gap between the nozzle shaft portion 174 and the nozzle cap 178 in the radial direction brings a portion of the inside of the mounting tube 171 behind the nozzle shaft portion 174 and the ejecting hole 4 in communication with each other.

Next, a case in which the trigger-type liquid ejector 1 configured as described above is used will be described.

Further, the respective parts of the trigger-type liquid ejector 1 are filled with the liquid by a plurality of operations of the trigger portion 51, and the liquid can be suctioned up from the longitudinal supply tube portion 10.

In a state shown in FIG. 1, when the trigger portion 51 is pulled rearward against the biasing force of the coil spring 54, since the piston 52 is moved rearward from the foremost position according to rearward movement of the trigger portion 51, the cylinder 53 can be pressurized. Accordingly, the liquid in the cylinder 53 can be supplied into the inner tube 13 of the longitudinal supply tube portion 10 through the communication tube portion 53*d*. Then, the liquid that has been supplied into the inner tube 13 presses the ball valve 36 being closed due to its own weight downward toward the upper end surface of the support tube portion 16, and pushes the valve main body portion 22 of the reservoir valve 20 upward to open the reservoir valve 20.

Accordingly, the liquid is supplied into the reservoir cylinder 90 from the inner tube 13 via the connecting tube portion 30 and the supply hole 91, and the reservoir cylinder 90 is pressurized. According to the pressurization in the reservoir cylinder 90, the reservoir plunger 110 is moved rearward from the maximum advance position against the biasing force of the biasing member 160. Further, in an initial stage in which the liquid begins to be introduced into the reservoir cylinder 90, the liquid enters the concave groove 124. For this reason, the reservoir plunger 110 is easily moved rearward.

Since the reservoir plunger 110 is moved rearward, the protrusion 122*a* of the closing wall 122 can be separated from the communication hole 95 to open the valve and open the communication hole 95. Accordingly, the liquid, a pressure of which is increased, can be introduced into the ejecting hole 4 through the communication hole 95 and the injection tube portion 11, and the liquid can be injected forward from the ejecting hole 4.

In this way, whenever the trigger portion 51 is pulled rearward, the liquid can be injected from the ejecting hole 4, and the reservoir plunger 110 can be moved rearward and the liquid can be stored (i.e., filled) in the reservoir cylinder 90.

After that, when pulling of the trigger portion 51 is stopped and the trigger portion 51 is released, since the piston 52 is moved to return forward in the cylinder 53 by the biasing force of the coil spring 54, the trigger portion 51 is biased forward to return to its original position. For this reason, since the pressure in the cylinder 53 can be decompressed to be more negative than the pressure in the container body A, the liquid in the container body A can be suctioned up into the longitudinal supply tube portion 10.

Then, the newly suctioned liquid pushes up the ball valve 36 to open the valve, and is introduced into the cylinder 53 through the communication tube portion 53*d*. Accordingly, this will be prepared for the next injection.

When the operation of the trigger portion 51 is stopped, supply of the liquid into the reservoir cylinder 90 through the longitudinal supply tube portion 10 and the connecting tube portion 30 is stopped, and the biasing force of the biasing member 160 causes the reservoir plunger 110 to begin to move forward toward the maximum advance position. Here, the outflow of the liquid from the reservoir cylinder 90 into the longitudinal supply tube portion 10 is restricted by the reservoir valve 20.

Accordingly, the liquid stored in the reservoir cylinder 90 can be introduced into the ejecting hole 4 through the communication hole 95 and the injection tube portion 11, and the liquid can be continuously injected forward through the ejecting hole 4.

In this way, the liquid can be injected not only when the trigger portion 51 is pulled rearward but also when the trigger portion 51 is not operated, and thus, the liquid can be continuously injected.

Figure 3:
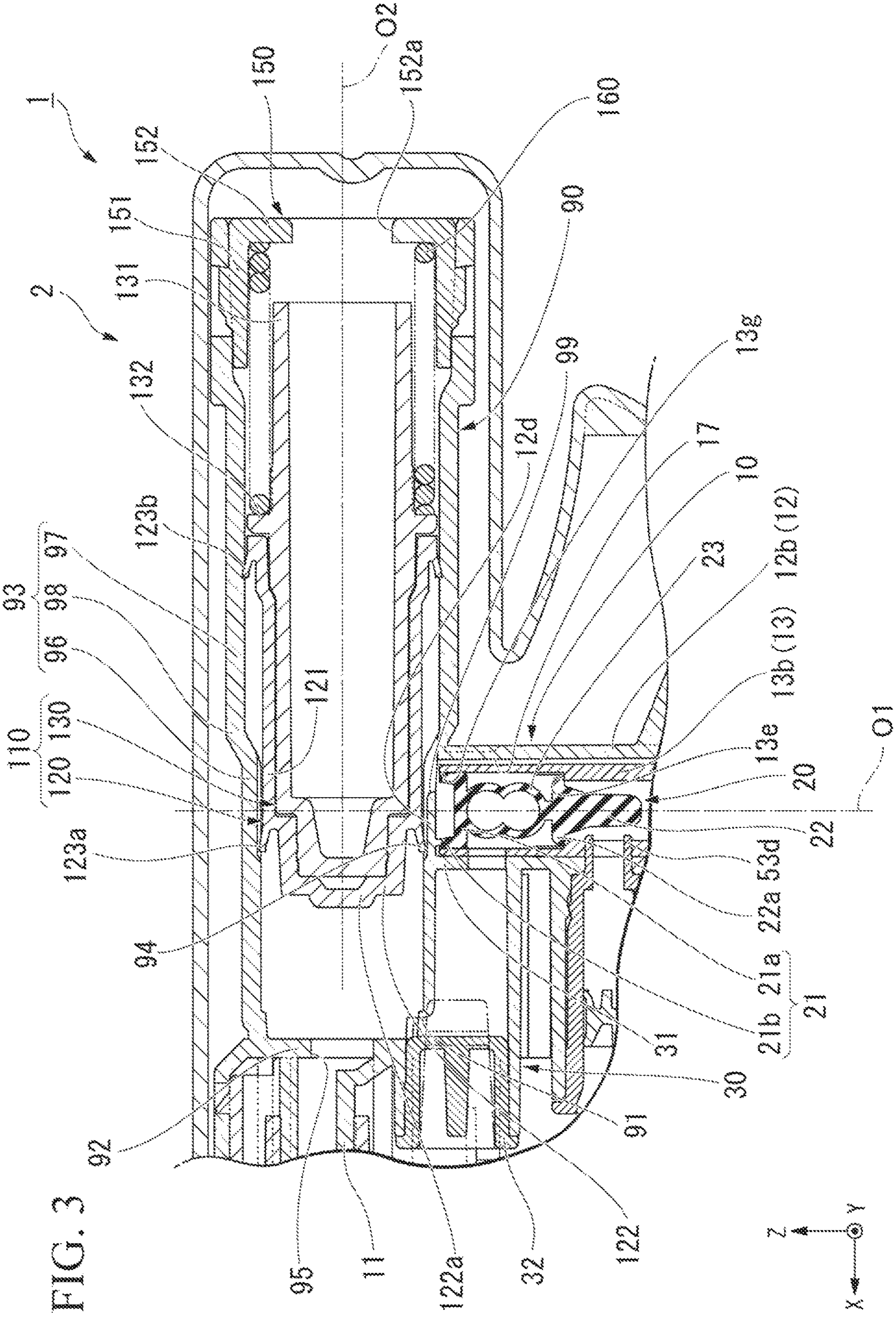
FIG. 3 is a cross-sectional view showing a part of the trigger-type liquid ejector according to the embodiment and showing a state in which a reservoir plunger is moved rearward.

Here, in a state in which the reservoir plunger 110 is located at the maximum retreat position, if the trigger portion 51 is pulled rearward, it is conceivable that the liquid is excessively supplied into the reservoir cylinder 90, causing liquid leakage and damage to each part. However, in the embodiment, as shown in FIG. 3, when the reservoir plunger 110 is moved somewhat rearward, the front lip portion 123*a* reaches at a position facing the communicating groove 94 in the radial direction, and a space in the reservoir cylinder 90 located in front of the reservoir plunger 110 communicates with the container body A via the communicating groove 94, the recovery hole 99, and the recovery passage 17. That is, the recovery passage 17 brings the reservoir cylinder 90 and the container body A in communication with each other when the reservoir plunger 110 is moved rearward. Accordingly, some of the liquid in the reservoir cylinder 90 is returned into the container body A, and it is possible to prevent the liquid from being excessively supplied into the reservoir cylinder 90. Accordingly, it is possible to prevent the pressure in the reservoir cylinder 90 from becoming excessively high, and prevent occurrence of liquid leakage and damage to each part.

According to the embodiment, the reservoir valve 20 is provided in the inner tube 13 of the longitudinal supply tube portion 10, and allows supply of the liquid from the longitudinal supply tube portion 10 into the reservoir cylinder 90 as being elastically deformed in the vertical direction. For this reason, in comparison with the case in which the reservoir valve 20 is disposed in the reservoir cylinder 90, it is easy to make the reservoir valve 20 smaller and to secure the elastic force of the reservoir valve 20. Accordingly, it is easy to secure sealability by the reservoir valve 20. In addition, unlike the case in which the supply hole 91 is closed by a part of the annular valve body in the circumferential direction, it is possible to prevent the variation in sealability. In addition, since the elastic deforming portion 23 in the reservoir valve 20 is elastically deformed in the vertical direction as a whole, in comparison with the case in which only a part of the electrically deformed portion is elastically deformed, it is difficult to settle the reservoir valve 20 and it is easy to maintain the sealability appropriately. Accordingly, according to the embodiment, the trigger-type liquid ejector 1 having a structure capable of improving sealability by the reservoir valve 20 is obtained.

In addition, according to the embodiment, the reservoir valve 20 includes the fixed portion 21 fixed into the upper end opening portion 13*g* of the inner tube 13, and the fixed portion 21 tightly closes the upper end opening portion 13*g* of the inner tube 13. For this reason, the upper end opening portion 13*g* of the inner tube 13 can be closed while improving moldability by making the inner tube 13 to open upward. In particular, when the inner tube 13 can be formed to open upward, it is easy to mold the valve seat portion 13*e* through injection molding using a mold or the like. In addition, since the upper end opening portion 13*g* is closed using the reservoir valve 20, in comparison with the case in which the member configured to close the upper end opening portion 13*g* is separately provided, the number of parts of the trigger-type liquid ejector 1 can be reduced. In addition, since the upper end opening portion 13*g* can be closed by attaching the reservoir valve 20 into the inner tube 13, there is no need to separately perform a work of closing the upper end opening portion 13*g* in addition to the attachment work of the reservoir valve 20. Accordingly, the trigger-type liquid ejector 1 can be easily assembled.

In addition, according to the embodiment, the inner diameter of the connecting tube portion 30 is equal to or greater than the inner diameter of the inner tube 13. For this reason, it is easy to increase the inner diameter of the connecting tube portion 30 relatively. Accordingly, it is easy to mold the connecting tube portion 30 through injection molding using a mold or the like.

In addition, according to the embodiment, the biasing member configured to bias the trigger portion 51 forward is the coil spring 54 disposed in the cylinder 53, configured to bias the piston 52 forward, and formed of a metal. For this reason, in comparison with the case in which the biasing member is, for example, a resin member that connects the trigger portion 51 and the cover body 140, durability of the biasing member configured to bias the trigger portion 51 forward can be increased. Accordingly, even when a relatively large load is applied by the operation of the trigger portion 51, it is possible to prevent the biasing member (i.e., the coil spring 54) from being degraded.

In addition, in the structure in which the liquid is stored in the reservoir cylinder 90 like the embodiment, since there is a need to move the reservoir plunger 110 against the biasing member 160, it is easily to apply a relatively large load to the biasing member according to the operation of the trigger portion 51. For this reason, an effect of preventing the biasing member from being degraded can be obtained more usefully using the biasing member as the coil spring 54 like the embodiment.

Further, the present invention is not limited to the above-mentioned embodiment, and the following configuration can be employed. The reservoir valve may have any shape or may be any type of valve as long as the valve is provided in the inner tube and the supply of the liquid from the longitudinal supply tube portion into the reservoir cylinder can be allowed by being elastically deformed in the vertical direction while restricting the outflow of the liquid from the reservoir cylinder into the longitudinal supply tube portion. The fixed portion of the reservoir valve may tightly close the upper end opening portion of the inner tube.

Figure 4:
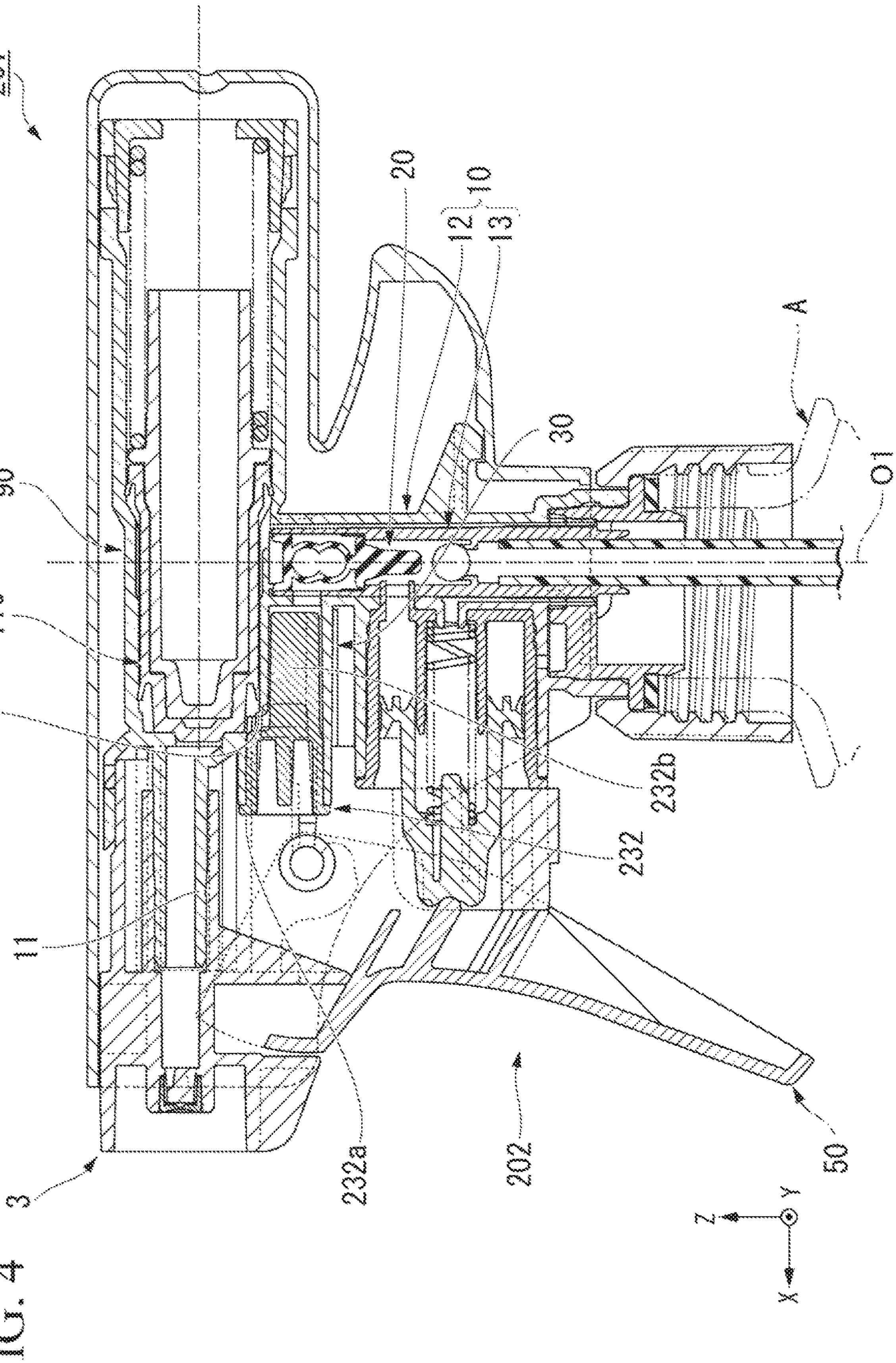
FIG. 4 is a cross-sectional view showing a trigger-type liquid ejector according to a variant of the embodiment.
Figure 5:
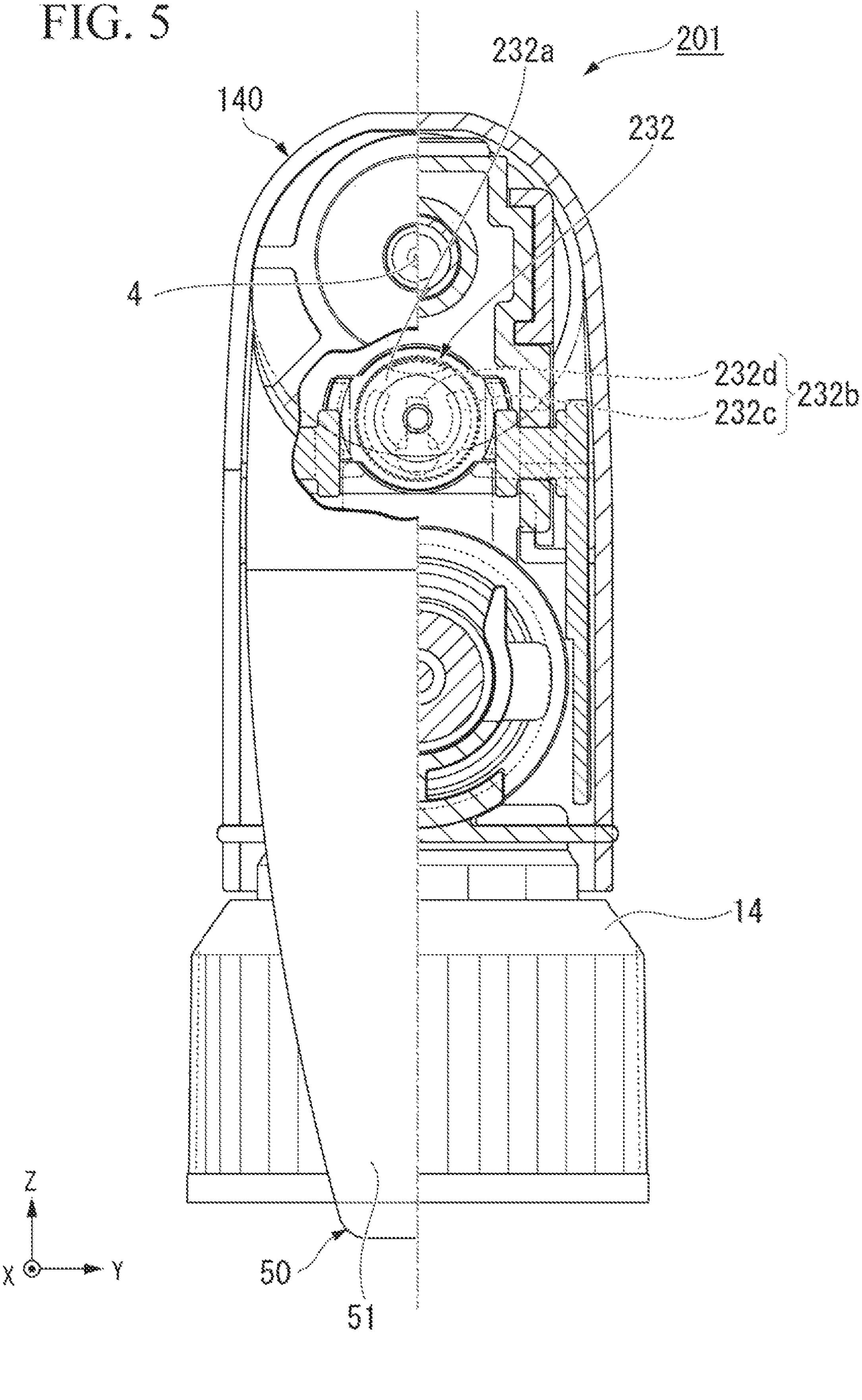
FIG. 5 is a partial cross-sectional view showing the trigger-type liquid ejector according to the variant of the embodiment when seen from a forward side.

In addition, the trigger-type liquid ejector may be configured like a trigger-type liquid ejector 201 shown in FIGS. 4 and 5. As shown in FIG. 4, in the ejector main body 202 of the trigger-type liquid ejector 201, a restricting plug 232 includes a main body portion 232*a* configured to close a front end opening portion of the connecting tube portion 30, and an extension portion 232*b* extending rearward from the main body portion 232*a*. The main body portion 232*a* has the same shape as the restricting plug 32 of the above-mentioned embodiment. A rear end portion of the extension portion 232*b* extends to the vicinity of the bottom portion of the connecting tube portion 30, and faces the bottom portion of the connecting tube portion 30 with a slight gap. A slight gap is provided between an outer circumferential surface of the extension portion 232*b* and an inner circumferential surface of the connecting tube portion 30.

As shown in FIG. 5, the extension portion 232*b* includes, for example, a first extension portion 232*c* formed in a C shape that opens upward around a central axis of the connecting tube portion 30 when seen in the forward/rearward direction and extending in the forward/rearward direction, and a second extension portion 232*d* standing upward from the lower end portion of the first extension portion 232*c* and extending in the forward/rearward direction. The second extension portion 232*d* is located inside the first extension portion 232*c*, and an inner portion of the first extension portion 232*c* is divided in the leftward/rightward direction. The upper end portion of the first extension portion 232*c* and the upper end portion of the second extension portion 232*d* are disposed at the same position in the vertical direction. Since the first extension portion 232*c* and the second extension portion 232*d* are provided, the extension portion 232*b* has, for example, an anchor shape when seen in the forward/rearward direction.

The other components of the trigger-type liquid ejector 201 are the same as the other components of the trigger-type liquid ejector 1 of the above-mentioned embodiment.

Like the configuration shown in FIG. 4, since the extension portion 232*b* is provided in the restricting plug 232, a capacity of a route through which the liquid passes in the connecting tube portion 30 can be reduced, and the connecting tube portion 30 can be easily filled with the liquid. Accordingly, the liquid can be easily supplied from the longitudinal supply tube portion 10 into the reservoir cylinder 90 via the connecting tube portion 30.

Further, the shape of the extension portion 232*b* is not particularly limited, and may be, for example, a cylindrical shape with a bottom that opens rearward. In this case, the extension portion 232*b* having the cylindrical shape with a bottom may be fitted into the connecting tube portion 30. In addition, a hole in communication with the supply hole 91 of the reservoir cylinder 90 may be formed in the extension portion 232*b* having the cylindrical shape with a bottom.

Hereinabove, the components described herein may be combined with each other to the extent that they do not contradict each other.

INDUSTRIAL APPLICABILITY

According to an aspect of the present invention is directed to providing a trigger-type liquid ejector having a structure capable of improving sealability by a reservoir valve.

REFERENCE SIGNS LIST

1, 201 Trigger-type liquid ejector
2, 202 Ejector main body
3 Nozzle member
4 Ejecting hole
10 Longitudinal supply tube portion
12 Outer tube
13 Inner tube
13*e* Valve seat portion
13*g* Upper end opening portion
17 Recovery passage
20 Reservoir valve
21 Fixed portion
22 Valve main body portion
23 Elastic deforming portion
50 Trigger mechanism
51 Trigger portion
53 Cylinder
90 Reservoir cylinder
110 Reservoir plunger
160 Biasing member
A Container body

What is claimed is:

1. A trigger-type liquid ejector comprising:
an ejector main body mounted in a container body in which a liquid is accommodated; and
a nozzle member provided with an ejecting hole configured to inject the liquid forward, wherein:
the ejector main body includes:
a longitudinal supply tube portion extending in a vertical direction, and configured to suction up the liquid in the container body;
a trigger mechanism including a trigger portion disposed to be movable rearward while being biased forward in front of the longitudinal supply tube portion, and configured to cause the liquid to flow from the longitudinal supply tube portion toward the ejecting hole according to rearward movement of the trigger portion;
a reservoir cylinder into which the liquid that has passed through the longitudinal supply tube portion is supplied according to rearward movement of the trigger portion;
a reservoir plunger disposed to be movable in an axial direction along a center axis of the reservoir cylinder in the reservoir cylinder, configured to move toward one side in the axial direction according to supply of the liquid into the reservoir cylinder, and biased toward the other side in the axial direction by a biasing member; and
a reservoir valve configured to allow supply of the liquid from the longitudinal supply tube portion into the reservoir cylinder, and configured to restrict outflow of the liquid from the reservoir cylinder into the longitudinal supply tube portion,
the longitudinal supply tube portion includes:
an outer tube; and
an inner tube fitted into the outer tube, and through which the liquid being to be supplied into the reservoir cylinder flows, a recovery passage, configured to allow communication between the reservoir cylinder and the container body when the reservoir plunger is moved to the one side, is provided between the outer tube and the inner tube, the reservoir valve is provided in the inner tube and configured to allow supply of the liquid from the longitudinal supply tube portion into the reservoir cylinder by being elastically deformed in the vertical direction, a recovery hole is formed in the reservoir cylinder, the recovery hole being configured to bring a space in the reservoir cylinder located at the other side from the reservoir plunger and the recovery passage in communication with each other when the reservoir plunger is moved toward the one side, an upper end portion of the inner tube is an upper end opening portion that opens upward, the reservoir valve includes a fixed portion fixed into the upper end opening portion, the fixed portion includes:

a disk portion disposed coaxially with a center axis of the longitudinal supply tube portion; and a tubular portion protruding upward from an outer circumferential edge portion of the disk portion, and an outer circumferential surface of the tubular portion is tightly fitted into an inner circumferential surface of the upper end opening portion.

2. The trigger-type liquid ejector according to claim 1, wherein:

a valve seat portion on which the reservoir valve is seated from above is formed on an inner circumferential surface of the inner tube, and the reservoir valve further includes:

a valve main body portion seated on the valve seat portion from above; and an elastic deforming portion that connects the fixed portion and the valve main body portion, and configured to be elastically deformed in the vertical direction.

* * * * *